US006619677B2

(12) United States Patent
Wei

(10) Patent No.: US 6,619,677 B2
(45) Date of Patent: Sep. 16, 2003

(54) CHILD'S RIDE-ON VEHICLE

(76) Inventor: Chung-Chun Wei, No. 22, Chung Shann 10th Street, Tainan City (TW)

( * ) Notice: Subject to any disclaimer, the term of this patent is extended or adjusted under 35 U.S.C. 154(b) by 0 days.

(21) Appl. No.: 09/899,740

(22) Filed: Jul. 3, 2001

(65) Prior Publication Data

US 2003/0011158 A1 Jan. 16, 2003

(51) Int. Cl.[7] .................................................. B62M 1/00
(52) U.S. Cl. ................................................. 280/87.021
(58) Field of Search ......................... 280/87.01, 87.021, 280/263, 267, 827, 828, 1.12, 1.23, 829, 218; D21/419, 424, 425, 426

(56) References Cited

U.S. PATENT DOCUMENTS

| 1,742,518 A | * | 1/1930 | Rainey ..................... 280/87.01 |
| 3,492,017 A | * | 1/1970 | Czichos ................. 280/87.021 |
| 4,261,588 A | * | 4/1981 | Kassai ....................... 280/7.17 |
| D275,299 S | * | 8/1984 | Petersson et al. .......... D21/424 |
| 5,461,938 A | * | 10/1995 | Froling et al. |
| 6,155,902 A | * | 12/2000 | Kole, Jr. et al. ............. 446/230 |
| D448,430 S | * | 9/2001 | Wang ......................... D21/433 |
| 6,386,304 B1 | * | 5/2002 | Wang ..................... 280/218 X |
| 6,431,566 B1 | * | 8/2002 | Gu ......................... 280/87.021 |

OTHER PUBLICATIONS

U.S. patent application Publication 2001/0040352—dated Nov. 2001.*
U.S. patent application Publication 2001/0052682—dated Dec. 2001.*

* cited by examiner

Primary Examiner—Brian L. Johnson
Assistant Examiner—Bryan Fischmann

(57) ABSTRACT

A child's ride-on vehicle consists of a body, a seat on the body, and a rear wheels below of the body, a steering axle frame at upper front of the body, and a front wheel mounting at front below of the body, two front wheels are set on the front wheel mounting, and a steering axle extended up from the front wheel mounting through the body, and a steering axle frame set to the body, then is fixed on the steering wheel.

4 Claims, 8 Drawing Sheets

CHILD'S RIDE-ON VEHICLE

BACKGROUND OF THE INVENTION

A conventional child's ride-on vehicle include a bearing 12 (as shown on FIG. 1) on the bearing block 11 of body 1 to allow turning between body 1 and steering axle 10. The steering axle 10 passes through the central hole 120 of bearing 12, then fastens with front wheel frame 1 to provide the turning for steering axle 10 by bearing 12. To allow for installation of bearing 12, a bearing block 11 is integrally formed on the body, in addition to more costs of bearing 12 resulting in increment of overall cost of child's ride-on vehicle, the bearing block 11 is formed on said body. To support the bearing, the bearing block must be the same height as the bearing 12, which results in the height of the body be increased in the vicinity of the bearing block. As a result, the total height of body of child's ride-on vehicle is raised which increases the possibility of the ride-on vehicle overturning, due to the higher center of gravity due to this design.

SUMMARY OF THE INVENTION

One of characteristics of this invention is to place two sliding washers inside the sliding washer flute of front wheel mounting for allowing smoother operation of the steering wheel.

Another characteristic of this invention is a steering axle frame set in the front of body, which can form a double-color system with body, and can be disassembled and assembled at one's will to reduce the volume of packing and storage for child's ride-on vehicle.

REFERENCE NUMBERS OF THE DRAWING

Body—2; Steering Axle Frame—3, 3A; Steering Axle—4;

Front Wheel—5; Steering Wheel—6; Bearing—7; Seat—20;

Front—22; Rear Wheel—23; Stuff Space—21; Combined Plug—30; Elastic Buckle—31; Steering Axle Hole—32; Nut—40; Front Wheel Mounting—50; Sliding Washer Flute—51; Sliding Washer—52; Fixed Hole Of Steering Axle—53; Screw—54; Combined Hole—220; Steering Axle Hole For Body—221; Down Wall—222; Bottom Wall—530; Screw Hole—531; Outer Surround—532.

DETAILED DESCRIPTION OF THE PREFERRED EMBODIMENT

Figure 1:
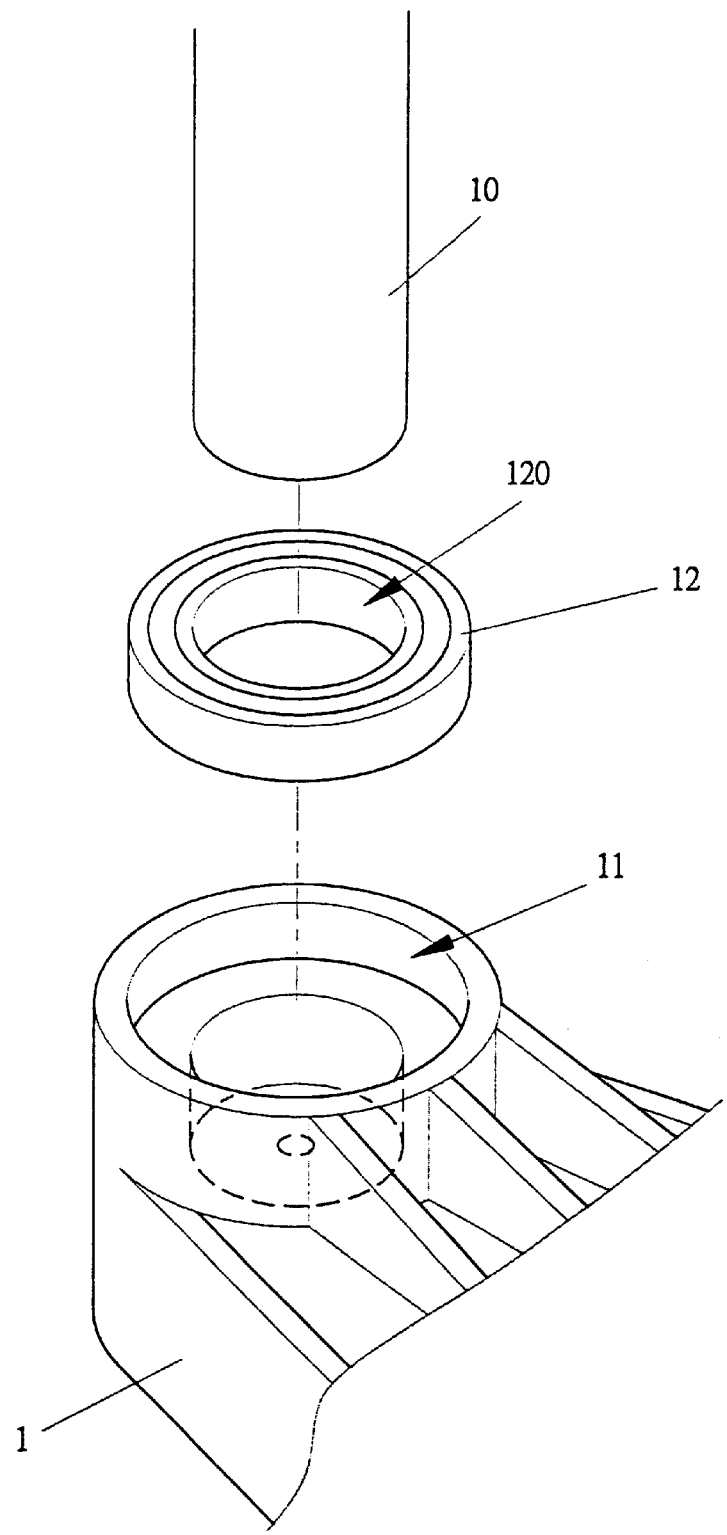
FIG. 1 is an exploded perspective view of front wheel mounting for conventional child's ride-on vehicle.
Figure 2:
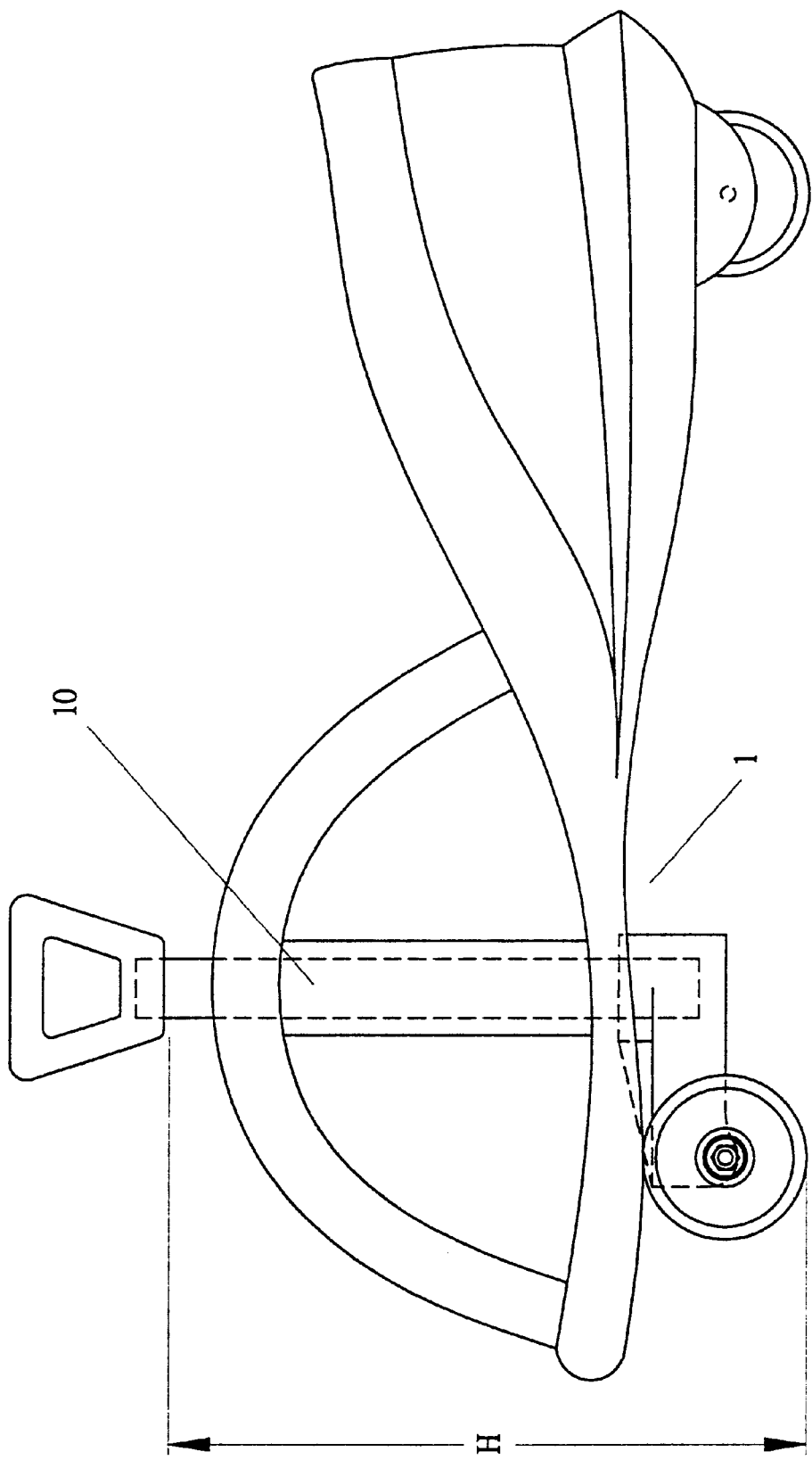
FIG. 2 is a cross-section view of body for conventional child's ride-on vehicle.
Figure 3:
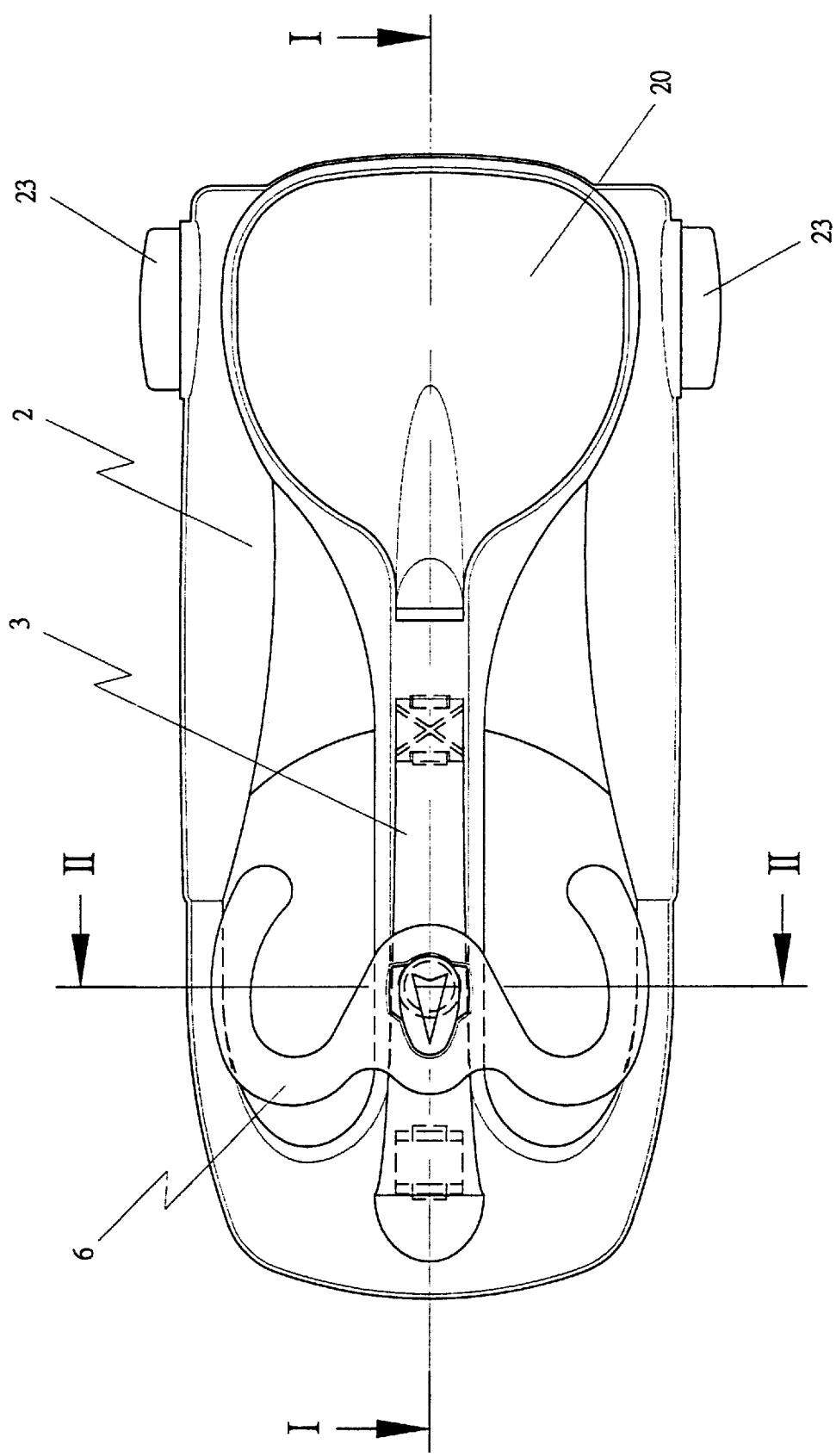
FIG. 3 is an upper view of first embodiment of child's ride-on vehicle in the invention.
Figure 4:
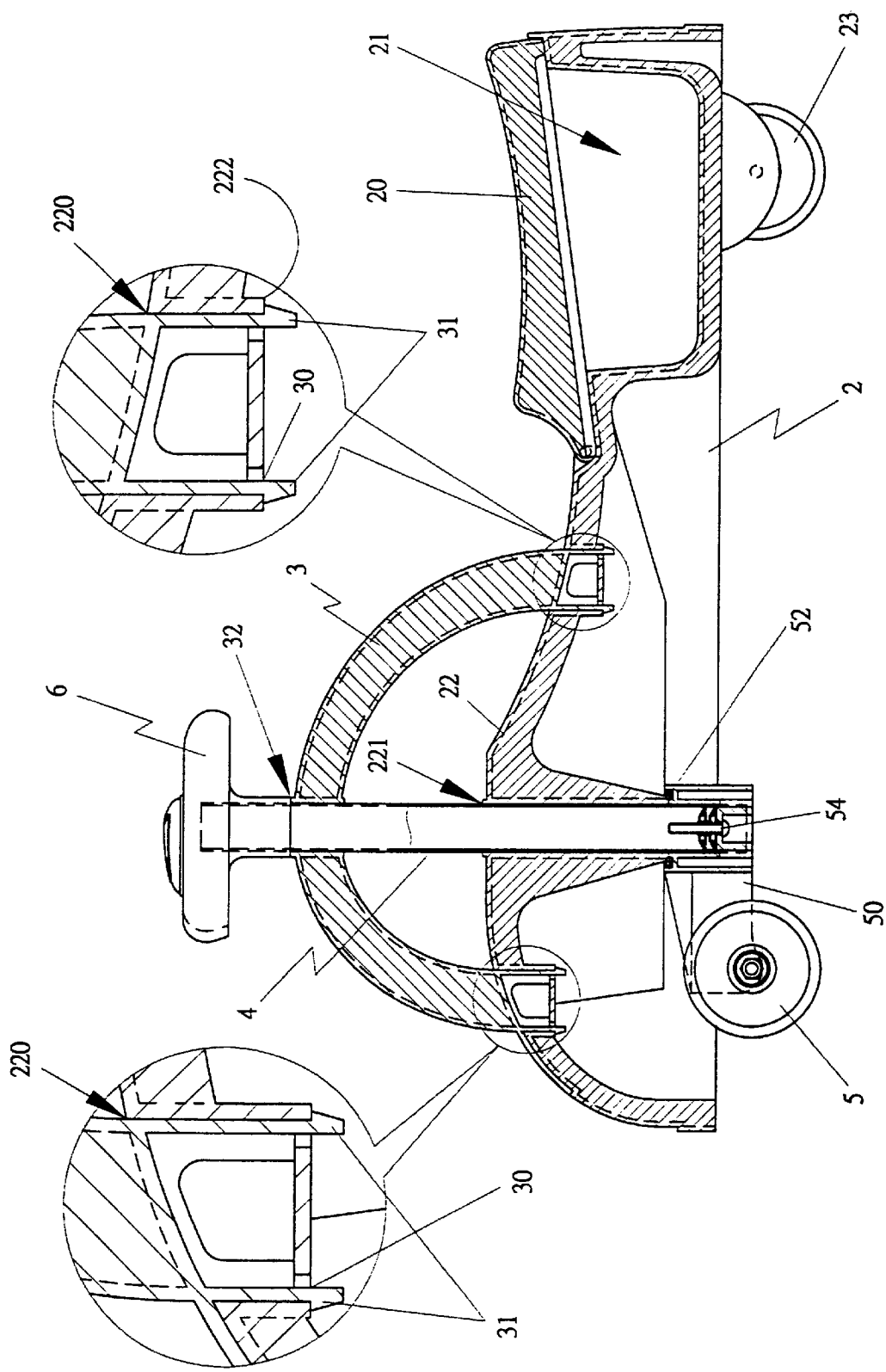
FIG. 4 is a cross-section view of line I—I in FIG. 3.
Figure 5:
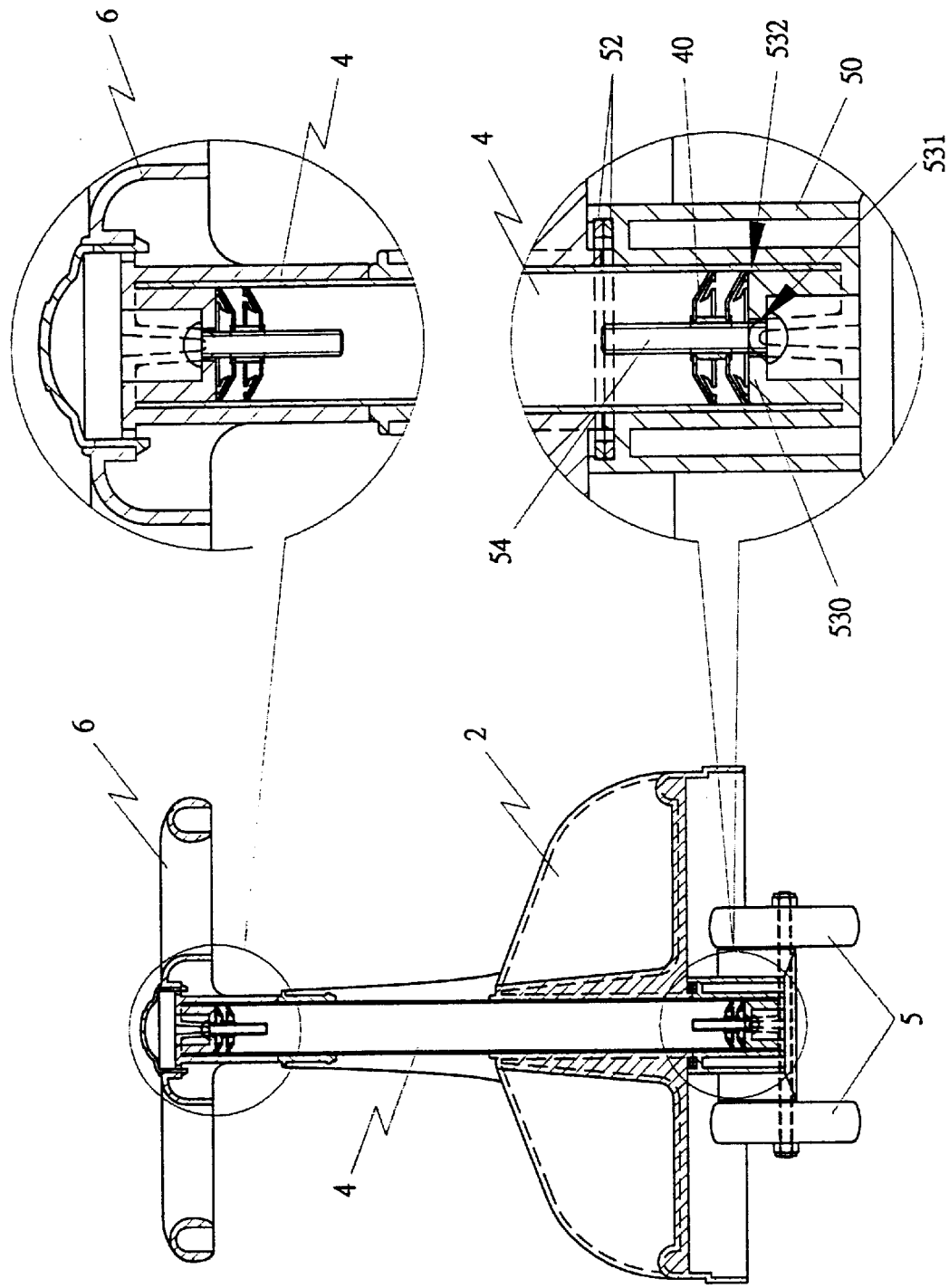
FIG. 5 is a cross-section view of line II—II in FIG. 3.

The first embodiment of child's ride-on vehicle of the invention, as shown on FIGS. 3 to 5 consists of a body 2, and a seat 20 on the body 2. A stuff space 21 is formed on one side of the seat 20 with the outlook could open toward one side to from a stuff space 21. And below the seat 20, there are rear wheels 23 set on body 2. Rear wheels 23 are installed at the rear of the body 2. In front 22 of the body 2, there are two combined holes 220 set for insert of combined plug 30 of steering axle frame 3. And use the one-unit forming elastic buckle 31 below the combined plug 30 to insert in the down wall 222 of combined holes 220 (as shown on FIG. 4). There is steering axle hole 32 on steering axle frame 3 and steering axle hole for body 221 on body 2 set for steering axle's passing through.

Figure 6:
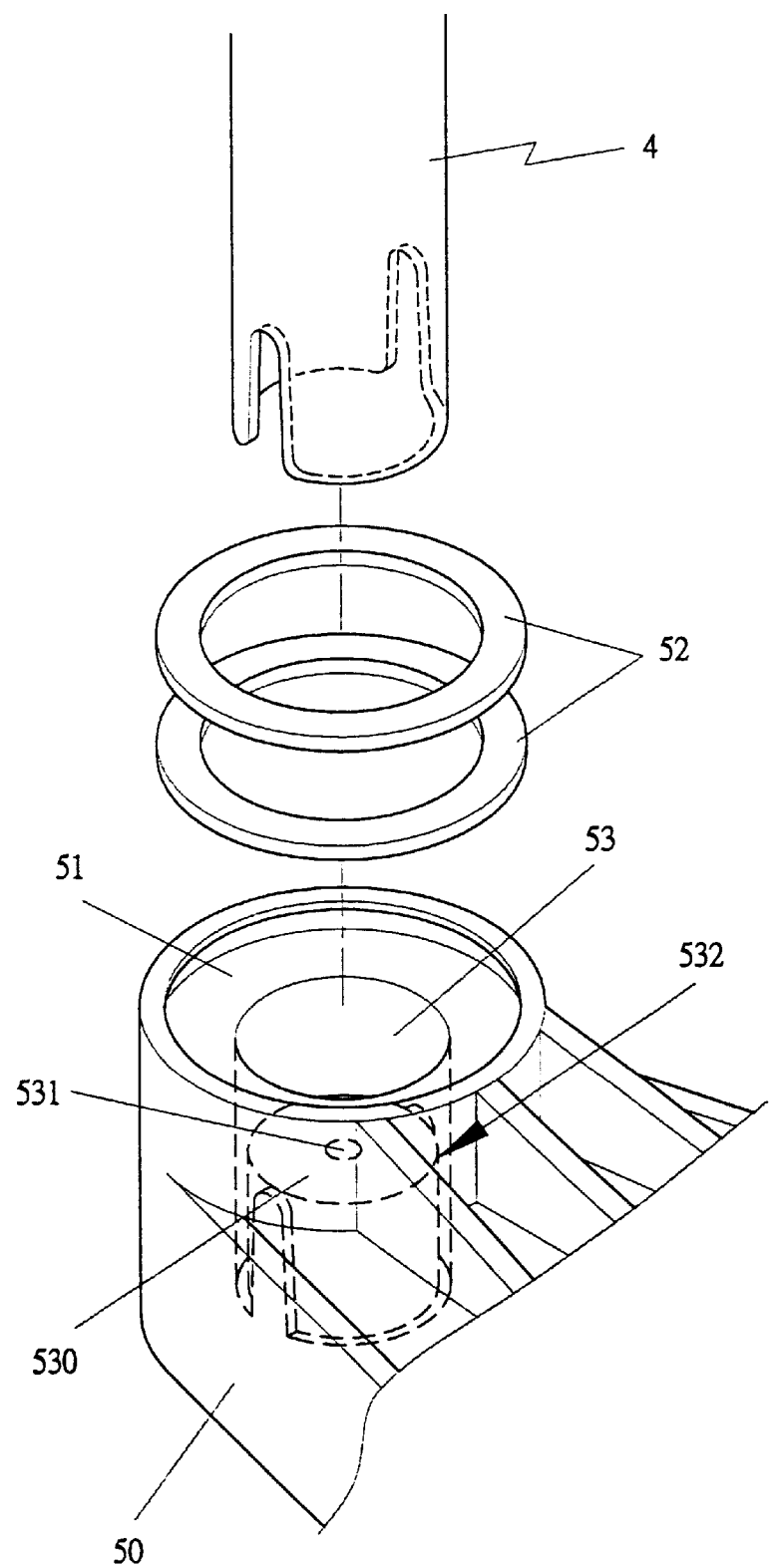
FIG. 6 is an exploded perspective view of front wheel mounting of first embodiment of child's ride-on vehicle in the invention.

Next there are front wheels 5 in front below the body. The front wheels 5 are set on the front wheel mounting 50 (as shown on FIGS. 4 to 6). The front wheel mounting 50 has a sliding washer flute 51 for installation of two washer 52 (or plural washers), and the fixed hole of steering axle 53 has bottom wall 530 with screw hole 531 as well as the deeper outer surround 532. The steering axle 4 is installed into the fixed hole of steering axle 53, and the steering axle 4 is fixed to the wheel mounting 50 by the screw 54 and nut 40.

The upper end of the steering axle extends up through the steering axle hole 32 of the steering axle frame 3 and is fastened to the steering wheel. The way to fasten steering wheel 6 with steering axle 4 is same as the way to fasten front wheel mounting with steering axle. After fastening, the structure of this invention is very firm not easy to disengage so as to meet the safe norm.

Figure 7:
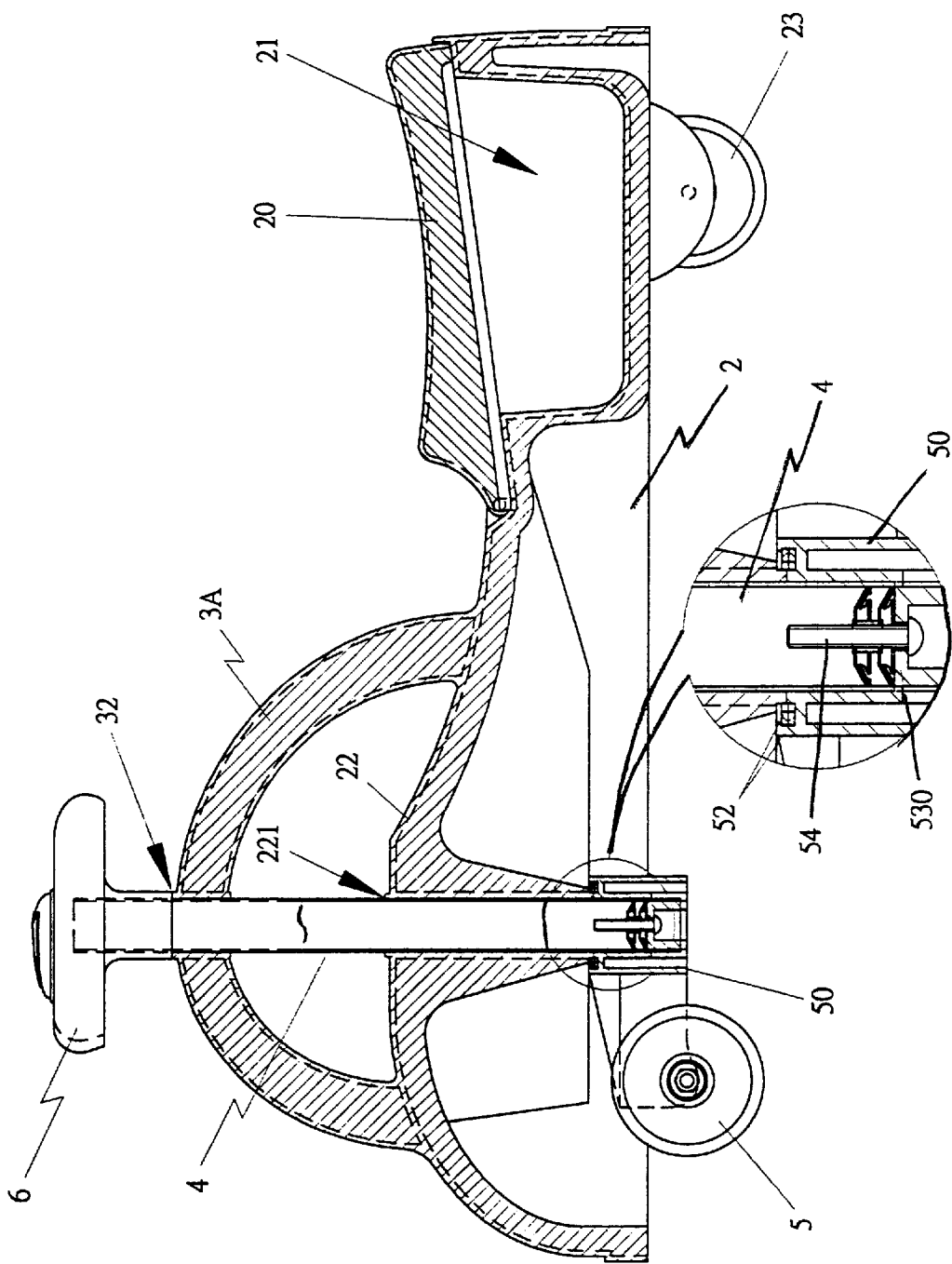
FIG. 7 is a cross-section view and enlarged view of the second embodiment of child's ride-on vehicle in the invention.
Figure 8:
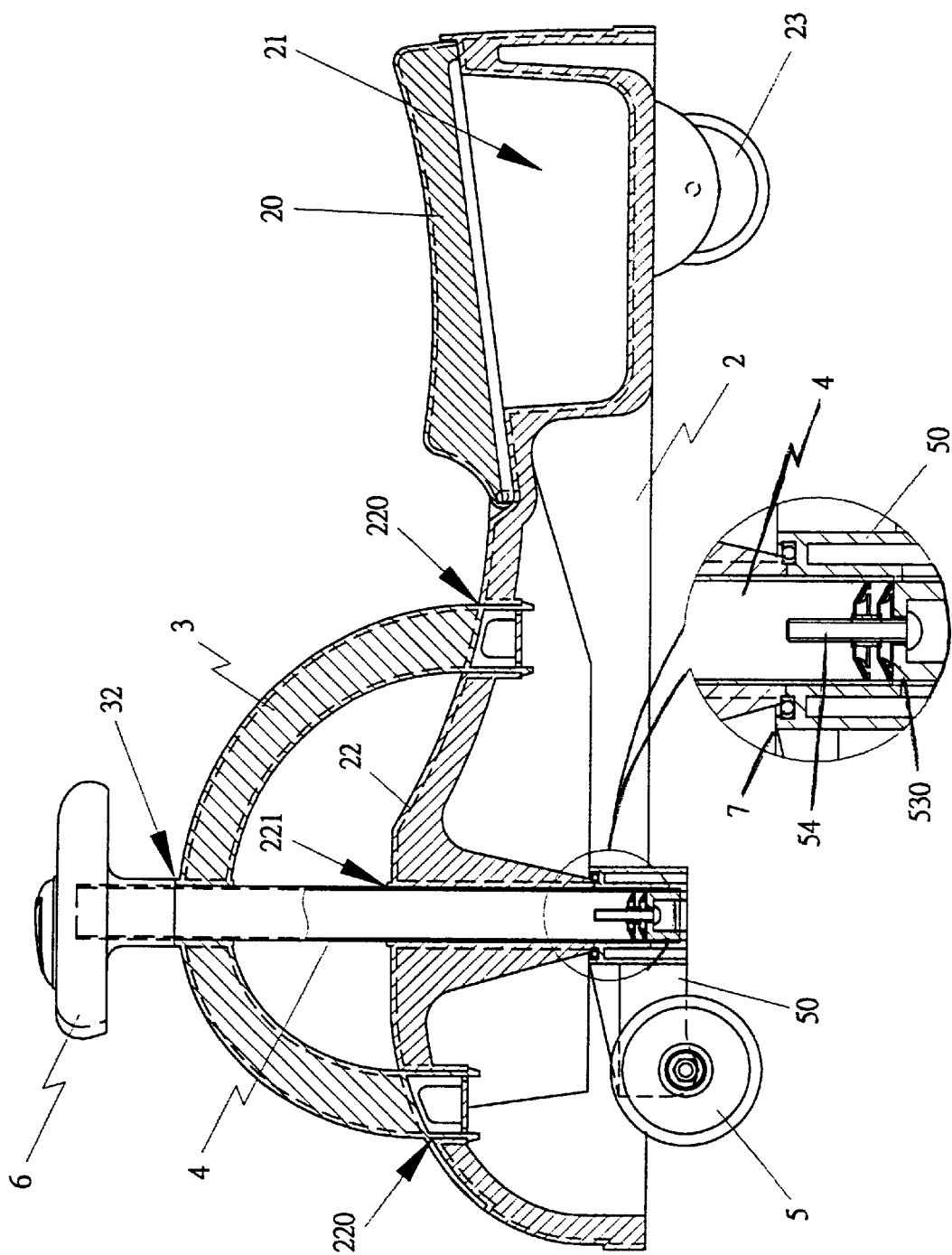
FIG. 8 is a cross-section view and enlarged view of the third embodiment of the invention.

FIGS. 7 and 8 show the second and third embodiment. Among the figures, second and third embodiments are derived from the first embodiment. The second embodiment is to produce steering axle frame 3A with body as one unit. However, the way of combining the steering axle 4 with front wheel mounting 50 is same as the second embodiment that both are made by two pieces of washer 52 (as shown on FIG. 6). The third embodiment is derived from the first embodiment that combines the steering axle frame 3 with two combined holes 220 of the front 22 of body. As for the way of combining the steering axle with front wheel mounting 50 one could use bearing 7 instead of two pieces of washer. The use of the bearing also allows the reduction in the body height and smoother operation of steering wheel.

What is claimed is:

1. A child's ride-on vehicle comprising:

a body, a seat at the rear end of the body, two rear wheels installed at the rear end of the body, two combined holes on the body to allow installation of two sides of a steering axle frame, the steering axle frame including a steering axle hole at a top side of the steering axle frame, the steering axle hole to allow a steering axle to be inserted through the top of the steering axle frame, an elastic buckle at each of the two sides of the steering axle frame, each elastic buckle utilized to attach one of the two sides of the steering axle frame to the body, a front wheel mounting attached to the front end of the body, two front wheels, each front wheel being installed on an opposite side of the front wheel mounting, a sliding washer flute is formed at an upper forward end of the front wheel mounting, a fixed hole is formed in a bottom of the sliding washer flute to receive a lower end of the steering axle, a nut installed inside the lower end of the steering axle, steering axle is fastened to the front wheel mounting by a screw which is inserted through a small screw hole at the fixed hole, the screw fastening to the nut instal led in the lower end of the steering axle.

2. The child's ride-on vehicle of claim 1 wherein the body is integrally formed.

3. The child's ride-on vehicle of claim 1 wherein a bearing is installed in the sliding washer flute.

4. The child's ride-on vehicle of claim 1 wherein two sliding washers are installed in the sliding washer flute.

* * * * *